US 6,685,204 B1

(12) United States Patent
Hehr

(10) Patent No.: US 6,685,204 B1
(45) Date of Patent: Feb. 3, 2004

(54) HITCH-MOUNTED EXTENSIBLE STEP FOR PICKUP TRUCKS AND OTHER VEHICLES HAVING TAILGATES

(76) Inventor: Kenneth L Hehr, 2395 Burk Rd., Blaine, WA (US) 98230

( * ) Notice: Subject to any disclaimer, the term of this patent is extended or adjusted under 35 U.S.C. 154(b) by 0 days.

(21) Appl. No.: 10/225,216

(22) Filed: Aug. 20, 2002

(51) Int. Cl.[7] .................................................. B60R 3/00
(52) U.S. Cl. ..................................... 280/166; 80/164.1
(58) Field of Search ............................. 280/163, 164.1, 280/166, 169, 491.1, 491.2, 491.3; 182/88

(56) References Cited

U.S. PATENT DOCUMENTS

| | | | | |
|---|---|---|---|---|
| 3,695,666 A | * | 10/1972 | Corson | 293/118 |
| 4,676,415 A | * | 6/1987 | Kennedy | 224/489 |
| D370,452 S | * | 6/1996 | Beasley | D12/203 |
| 5,738,362 A | * | 4/1998 | Ludwick | 280/166 |
| 6,170,843 B1 | * | 1/2001 | Maxwell et al. | 280/166 |
| 6,237,927 B1 | * | 5/2001 | Debo | 280/166 |
| 6,474,668 B2 | * | 11/2002 | Debo | 280/166 |
| 6,536,822 B1 | * | 3/2003 | Vagedes et al. | 296/26.1 |
| 2003/0011164 A1 | * | 1/2003 | Cipolla | 280/164.1 |
| 2003/0116938 A1 | * | 6/2003 | Shields et al. | 280/166 |

* cited by examiner

*Primary Examiner*—Avraham Lerner
(74) *Attorney, Agent, or Firm*—Todd N. Hathaway

(57) ABSTRACT

A step assembly for a pickup truck or other vehicle having a hitch receiver and a tailgate. The assembly includes a stationary upper support that is inserted in the receiver and a sliding lower support having a step mounted to its rearward end. The lower support is extensible from a retracted position in which the step member is positioned proximate the hitch receiver, to an extended position in which the step member is positioned rearwardly of the receiver by a distance sufficient that the step member may be stood upon when the tailgate of the vehicle is an open, lowered position. The step member pivots from a horizontal orientation in the deployed position to a vertical orientation when installed.

19 Claims, 5 Drawing Sheets

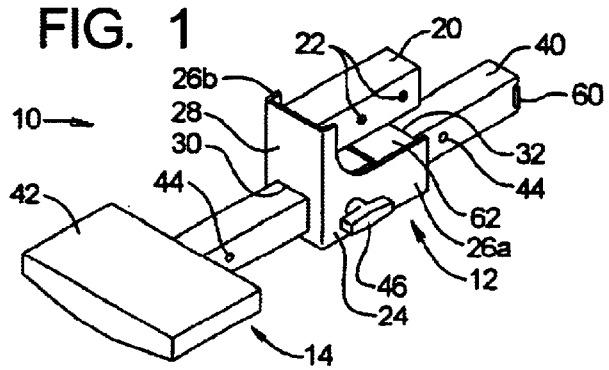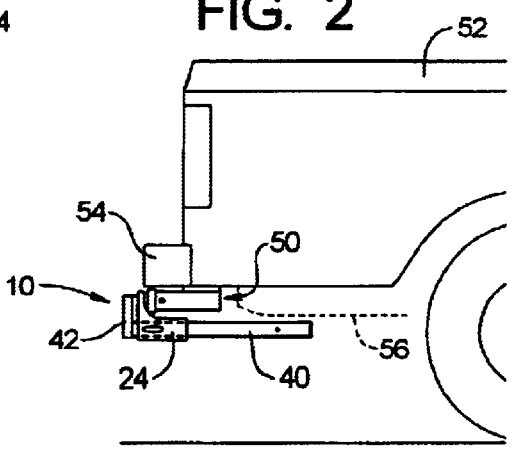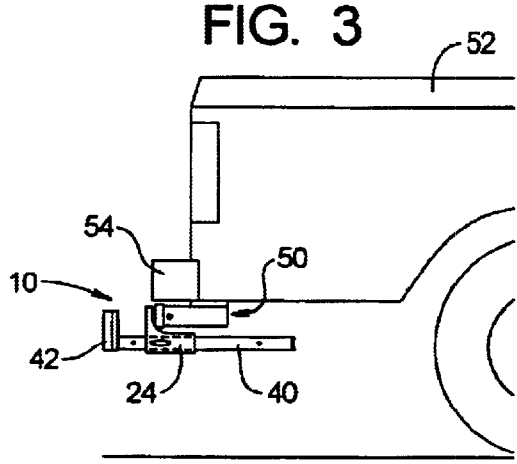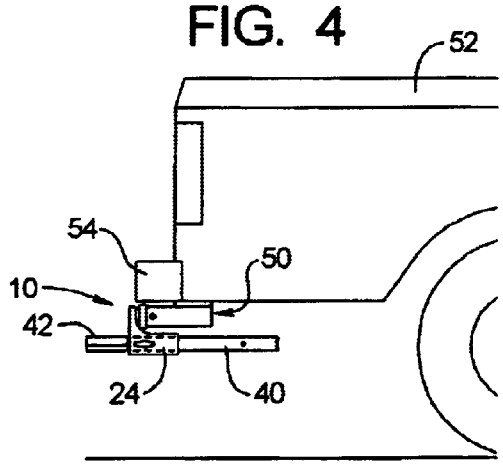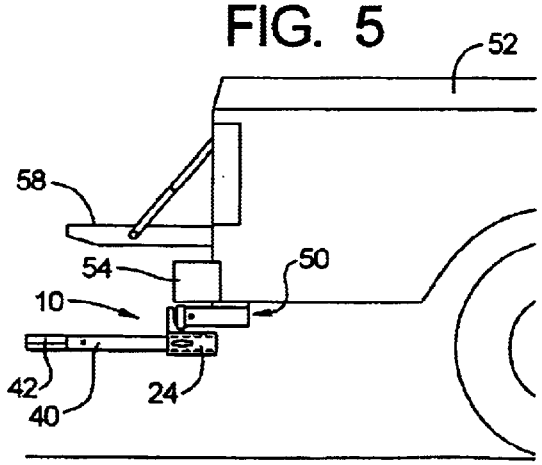

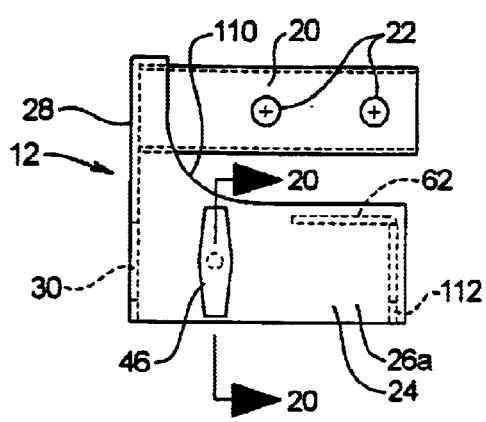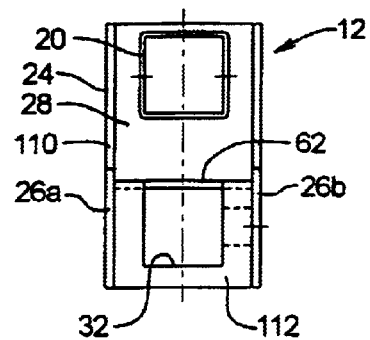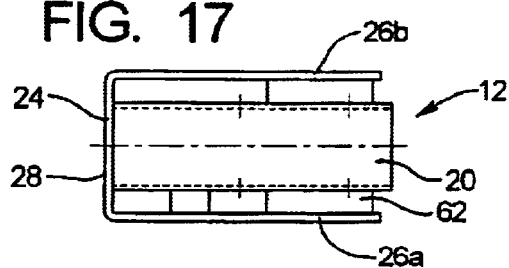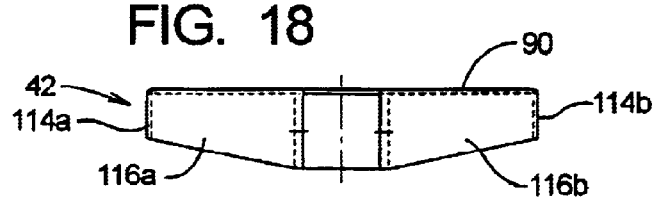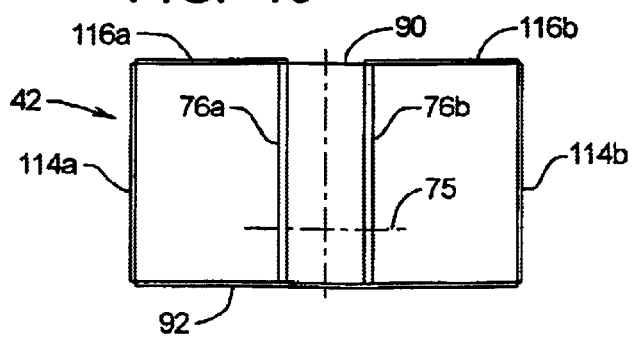

HITCH-MOUNTED EXTENSIBLE STEP FOR PICKUP TRUCKS AND OTHER VEHICLES HAVING TAILGATES

BACKGROUND a. Field of the Invention

The present invention relates generally to step platforms for vehicles, and, more particularly, to an extensible step assembly that mounts to a standard receiver hitch so as to provide step-up access to a pickup truck bed or the like when the tailgate is lowered.

b. Related Art

Climbing into and out of pickup truck boxes is a longstanding problem. As is well known, pickup trucks and like similar vehicles represent a convenient and versatile means for transporting all manner of articles. However, from time to time it is necessary for a person to climb into the pickup truck box in order to access the articles or load/unload the box. For example, a person must often climb into the box to lift lumber, boxes and other such articles into and out of the truck. Similarly, it is necessary to enter the box in order to shovel dirt or other loose material from the forward areas of the bed.

In years past a degree of access was provided by "step side" pickup truck boxes, in which a small step was provided just forward of the rear fenders. However, the great majority of modern pickup trucks are provided with full-width "style side" boxes which lack any such steps, so that access must be gained at the rear of the box.

For this reason, many modern pickups are provided with step bumpers on which a person can stand at the back of the box. Due to vehicle height, however, the tops of such bumpers are normally far too high for convenient step-up, so that a person must haul himself up while holding onto the top of the tailgate, which makes it essentially impossible to step up onto the bumper while carrying a heavy or bulky article. Moreover, once on top of the bumper, the person must still climb over the tailgate, which is a tricky and inconvenient and again difficult or impossible when carrying an article in one's arms. However, when the tailgate is down it covers the top of the step bumper, and the tailgate itself is far too high to step onto. In rare instances a loading dock is available that allows a person to walk into and out of a pickup truck box with the tailgate down, but most of the time the height of the bed presents a very real obstacle.

Certain devices have been proposed in the prior art for providing an auxiliary step that is mountable to a vehicle. Some of these devices have also successfully employed receiver hitches as convenient and secure mounting points. However, the majority of such devices are not suitable for use with a conventional pickup truck, whether for reasons of configuration or complexity/cost. In other instances, a step has been provided that is mountable to or at the rear bumper of a pickup truck. Although some of these devices provide an acceptable step-up height (as compared with a step bumper), they are still covered and rendered useless when the tailgate is opened. The steps also form a projection that can trip or bang the shins of persons walking and moving about the rear of the vehicle, and that also tends to strike the ground when entering/leaving driveways and other inclined roadways.

Accordingly, there exists a need for a step assembly that is mountable at the rear of a pickup truck or similar vehicle so as to assist in entering the box thereof, in which the step is accessible when the tailgate of the vehicle is in the open, lowered position. Furthermore, there exists a need for such a step assembly that detachably mounts to a standard receiver hitch at the rear of a pickup truck or similar vehicle, so as to be conveniently and stably secured thereto. Still further, there exists a need for such a step assembly that has a compact configuration when not in use so as to avoid excessive protrusions or obstacles at the rear of the vehicle. Still further, there exists a need for such an assembly that is rugged and durable, yet structurally simple so as to avoid excessive manufacturing costs.

SUMMARY OF THE INVENTION

The present invention has solved the problems cited above, and is a step assembly for a vehicle having a hitch receiver and a tailgate. Broadly, the hitch assembly comprises: a stationary upper support member that is insertable in the hitch receiver so as to support the assembly therefrom; (b) a frame member mounted to and extending downwardly from the upper support member; (c) at least one sliding lower support member mounted in the frame member generally below and parallel to the upper support member for movement from a forward, retracted position to a rearward, extended position; and (d) at least one step member mounted to a rearward end of the sliding lower support member so that when the lower support member is in the retracted position, the step member is positioned proximate the hitch receiver and when the lower support member is in the extended position the step member is positioned rearwardly of the hitch receiver by a distance sufficient that the step member may be stood upon when the tailgate of the vehicle is in an open, lowered position.

The step assembly may further comprise means for pivoting the step member from a generally horizontal orientation in which the step member may be stood upon when the lower support is in the extended position, to a generally vertical orientation in which the step member stows substantially flat with respect to a rear of the vehicle when the sliding lower support is in the retracted position. The means for pivoting the step member from the generally horizontal orientation to the generally vertical orientation may comprise a pivot shaft operatively interconnecting the step member and the rearward end of the lower support member.

The stationary upper support member may comprise a segment of substantially square-section stock dimensioned for insertion into a standard hitch receiver of predetermined size. The frame member may comprise a downwardly extending portion having at least one guide opening that receives the lower support member in sliding engagement therewith.

The assembly may further comprise means for selectively locking the lower support member in the retracted position so as to prevent the lower support member from sliding rearwardly while the vehicle is in operation. The means for locking the lower support member in the retracted position may comprise an opening formed in the lower support member proximate the rearward end thereof, and a locking pin mounted to the downwardly extending portion of the support member so as to retractably engage the opening when the lower support member is in the retracted position. The means for locking the lower support member in the retracted position may further comprise a handle mounted to an outer end of the locking pin for manually withdrawing the pin from engagement with the opening in the lower support, and a spring operatively connected to the locking pin so as to yieldingly bias the pin into engagement with the opening when the handle is released.

The assembly may further include a second opening formed in the lower support proximate a forward end thereof for being engaged by the locking pin so as to selectively lock the lower support in the extended position. A third opening may be formed in the lower support member intermediate the first and second openings for being engaged by the locking pin so as to selectively lock the lower support in an intermediate position in which the step member is positioned proximate a bumper of the vehicle, so that the step member may be stood upon to gain access to a rear compartment of the vehicle when the tailgate is in the closed, raised position.

The opening in the downwardly-extending portion of the frame member may be spaced below the upper support member by a distance sufficient that the lower support member when in the retracted position will clear a spare tire that extends below a rear of the vehicle by a predetermined distance.

The downwardly extending portion of the frame member may have forward and rearward axially aligned guide openings that maintain the lower support member in a substantially horizontal orientation as the lower support member is slid between said extended and retracted positions. The frame member may comprise a U-shaped support bracket having a rearward wall that is mounted to a rearward end of the upper support member, and first and second side walls that extend downwardly and forwardly so as to clear obstructions on the vehicle proximate the hitch receiver. The rearward guide opening may be formed in a rearward wall of the support bracket and the forward guide opening may be formed between forwardly-extending ends of the sidewalls thereof. The frame member may further comprise a reaction plate mounted to the support bracket adjacent to the forward guide opening so as to bear against and receive upward loads from an upper surface of the lower support member when the step member is stood upon.

The lower support member may comprise an elongate segment of substantially square-section stock, and the forward and rearward guide openings may each have a corresponding square configuration so that the guide openings bear against sides of the lower support member in a sliding engagement therewith.

The step assembly may further comprise means for selectively locking the step member in the horizontal orientation so that the step member provides a stable platform when stood upon. The means for locking the step member in the horizontal orientation may comprise: (a) a pivot slot formed in the lower support member and having the pivot shaft receiver therein in rotating engagement therewith; (b) a latch opening formed in an upper side of the lower support member and having a forward lip; (c) a latch hook mounted to the step member so as to extend downwardly through the latch opening when the step member is in the horizontal orientation and having a forwardly-facing jaw for engaging the forward lip of the latch opening; and (d) a spring member operatively interconnecting the pivot shaft and the lower support member so as to bias the shaft towards a forward end of the pivot slot; so that when the step member is in the horizontal orientation the jaw opening of the latch hook is urged by the spring into engagement with the forward lip of the latch opening so as to lock the step member in the horizontal orientation, and so that in response to an operator selectively drawing rearwardly on the step member the pivot shaft moves rearwardly in the pivot slot so as to disengage the jaw of the latch hook from the lip of the opening and thereby free the step member to be pivoted to the vertical orientation.

The pivot slot may comprise an L-shaped slot having a rearward, generally horizontally extending segment and a forward, generally downwardly extending segment, the spring member being configured to bias the pivot shaft forwardly and downwardly in the L-shaped slot, so that when the step member is in the horizontal orientation the pivot shaft is urged into the downwardly extending segment of the pivot slot so that a downwardly extending segment holds the shaft and step member against moving rearwardly and thereby prevents the jaw of the latch hook from inadvertently moving out of engagement with the lip of the latch opening, and so that in response to an operator. selectively lifting upwardly on the step member the pivot shaft moves upwardly out of the downwardly extending segment of the pivot slot and into the horizontally extending segment of the slot so that the step member may then be drawn rearwardly to disengage the jaw of the latch hook from the lip of the opening.

The spring member may comprise a tension spring having a first end mounted to the pivot shaft and a second end mounted to the lower support member forwardly and downwardly from the pivot shaft.

These and other features of the invention will be understood from a reading of the following detailed description with reference to the accompanying drawings.

BRIEF DESCRIPTION OF THE DRAWINGS

FIG. 1 is a perspective view of a step assembly in accordance with the present invention, showing the upper support for fitting into a receiver hitch on a pickup truck, and the extensible lower support on which the step member is mounted;

FIGS. 2–5 are sequential, elevational views of the step assembly of FIG. 1 mounted to a standard receiver hitch at the rear of a pickup truck, showing the manner in which the lower support of the step assembly slides rearwardly so that the step on the outer end thereof is accessible when the tailgate is open and in the down position;

FIG. 15 is a side, elevational view of the stationary support section of the step assembly of FIG. 1, showing the structure thereof in greater detail;

FIG. 16 is a rearward end, elevational view of the stationary support section of FIG. 15, showing the parallel, vertically spaced relationship between the stationary support member and the passage in which the lower support member is received for sliding motion;

FIG. 17 is a top, plan view of the stationary support section of FIGS. 15–16, showing the relationship between the upper support member and the bracket member by which the lower support member is suspended therefrom;

FIG. 18 is a forward end, elevational view of the pivoting step member of the step assembly of FIG. 1, showing the central opening in which the lower support member of the assembly is received;

FIG. 19 is a bottom, plan view of the step member of FIG. 18, showing the relationship of the central passage to the side portions of the step member in greater detail.

DETAILED DESCRIPTION a. Overview

Figure 6:
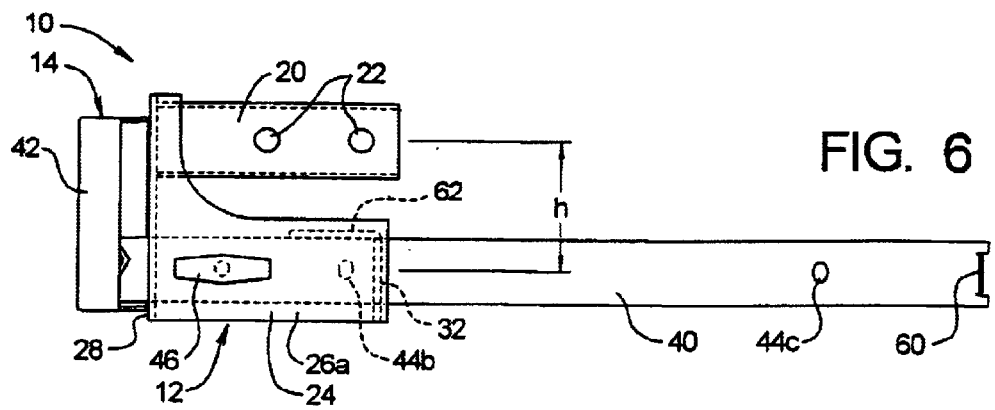
FIGS. 6–9 are sequential, elevational views of the hitch assembly of FIG. 1, similar to FIGS. 2–5 but without the pickup truck and receiver hitch, showing the orientation of the components of the assembly in each position in greater detail.
Figure 7:
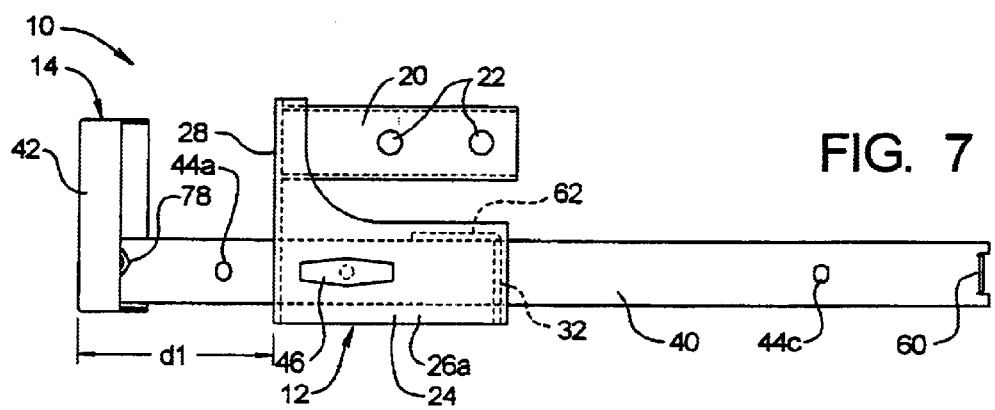
Figure 8:
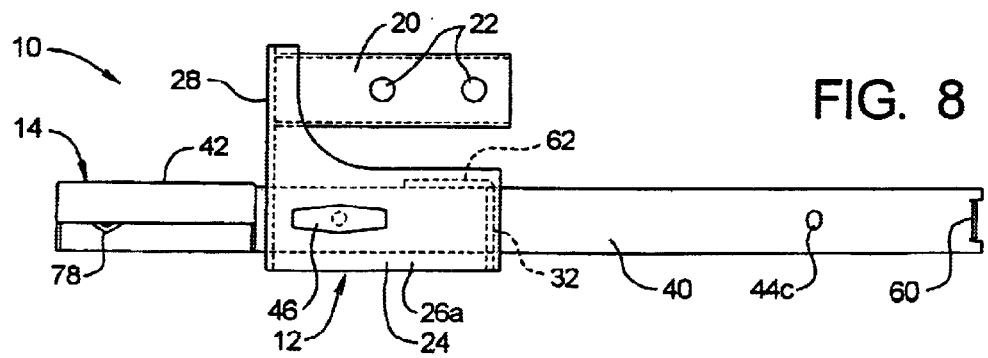

FIG. 1 shows a step assembly 10 in accordance with a preferred embodiment of the present invention. As can be seen, the principle components of the assembly include a stationary support section 12 and a telescoping step section 14.

The stationary support section includes an upper, horizontally extending support member 20 that is dimensioned to be inserted in a conventional receiver hitch; for a majority of applications, the upper support member is suitably fabricated of 2"×2" or 1¼"×1¼" steel stock, being that the majority of receiver hitches are designed to receive with ball mounts having these standardized dimensions. The upper support member has sufficient length (e.g., approximately 8") to be fully inserted in the tubular receiver, and is provided with one or more cross-bores 22 by which it may be secured in the receiver using a conventional hitch pin or other fastener.

The support section 12 further includes a bracket member 24 having first and second downwardly and forwardly extending sides flanges 26a–26b joined by a transverse web 28 that is mounted to the rearward end of the upper support member. As will be described in greater detail below, the support bracket is therefore somewhat U-shaped in plan view, and includes a horizontally extending passage that is defined by a rearward guide opening 30 and a forward guide opening 32 that is formed or mounted between the forwardly-projecting side flanges 26a–b.

As can be seen with further reference to FIG. 1, the forward guide and rearward openings 30, 32 receive the lower support member 40 of the assembly for sliding movement therethrough. The elongate lower support member may be formed of any suitable material, although a square or other non-circular cross-section is generally preferred so as to provide a sturdy and simple structure that prevents the lower support member and step from rotating within the stationary support section; in the illustrated embodiment, the lower support member is suitably formed of 2"×2" or 1¼"×1¼" square steel tube, in that this provides the assembly with excellent strength and durability, and moreover because using equal sized upper and lower support members simplifies manufacture of the bracket member and support section.

A pivotable step member 42 is mounted to the rearward end of the elongate lower support member. Accordingly, the longitudinal position of the step member 42 is selectively adjustable relative to the upper support member and the receiver in which it is mounted, by sliding the lower support member 40 rearwardly or forwardly through the guides in the lower portion of the stationary support section. The lower support member is provided with a plurality of cross-bores 44 that cooperate with the pin of a locking mechanism 46 to selectively lock the lower support and step members in a plurality of longitudinal positions relative to the stationary support section. As will be described in greater detail below, the lower support member in the illustrated embodiment is provided with three transverse bores 44, for selectively locking the lower support member in the retracted position in which the step member is stowed vertically adjacent the rear web of the support bracket 24, and first deployed position in which the step member is pivoted to a horizontal orientation for use but positioned adjacent the bumper, and a second deployed position in which the horizontal step is extended out away from the bumper so as to be accessible when the tailgate is in the open, lowered position.

Tailgate and bumper dimensions vary somewhat from manufacturer to manufacturer and model to model, however, the dimensions fall within a more-or-less determinate range for a given class of vehicles. For example, full-size pickups in the U.S. domestic market generally employ tailgates having heights of about 20 inches, and step bumpers some 4–6 inches wide. Most manufacturers install the hitch receiver so that its end opening is flush or inset just slightly (e.g. 1–2 inches) from the edge of the bumper. Therefore, a step assembly having a lower support that positions the forward edge of the step in the range of about 14–20 inches or more rearwardly of the receiver opening will be suitable for use with the majority of U.S. full size pickups. Corresponding dimensions can similarly be determined for compact and midsize pickups. Ergonomic factors can also be employed in determining the optimal locations of the step when in the deployed positions.

It will be understood that the term "pickup" as used in this description and the appended claims includes not only traditional, open bed pickup trucks, but those and all other vehicles having a similarly accessible cargo area. It will be further understood that the terms "formed", "rearward", "upper", "lower" and so on refer to like directions and locations with reference to such a vehicle when in its normal orientation.

b. Operation

The operation of the assembly will be described with reference to FIGS. 2–5, and also FIGS. 6–9, which show the assembly in corresponding positions but without the pickup truck and receiver hitch.

Accordingly, FIG. 2 shows the step assembly 10 mounted to a conventional receiver hitch 50 at the rear of the pickup truck 52. The receiver hitch is mounted in a conventional position beneath the truck bumper 54, where it is typically installed as either an OFM option or an after-market accessory.

FIG. 2 shows the step assembly in the stowed position, with the lower support member 40 in its forward, fully retracted position, and the step member 42 pivoted to a vertical orientation against the back of the support bracket 24. The vertical offset "h" (FIG. 6) between the upper and lower supports not only lowers the step member from the receiver to a more convenient step-up height, but it also positions the lower support member so that when retracted it has clearance to pass beneath the spare tire, which is commonly mounted under the rear of the bed as indicated by dotted line image 56.

When in the stowed position, the step member 42 is pivoted to a vertical orientation, with its upper surface facing outwardly. The assembly thus lies generally flat with respect to the rear of the vehicle and is very compact in the stowed position, with an absence of any significant protrusions that might strike the ground or present a hazard to passers-by.

Access to the bumper is unobstructed in the event that the operator wishes to step onto it in a conventional fashion without the assistance of the assembly 10. Moreover, the upturned, vertical surface of the step member 42 covers the rear of the hitch and the step assembly so as to present a neat appearance, and the surface of the step member can also be used to display a logo or ornamental pattern.

In order to deploy the step assembly, the operator pulls outwardly on the handle of the locking mechanism 46 so as to disengage the locking pin thereof from the cooperating opening 44a (see FIG. 7) and thereby free the lower support 40 for sliding, motion in the stationary support section. The step section 14 can then be pulled outwardly, using the sides of the step member as handles. When the lower support 40 reaches a first extended position, the pin of the locking mechanism 46 (as will be described in greater detail below) is resiliently urged into a second hole 44b, again locking the support shaft in place. In this first extended position, the distance "$d_1$" (see FIG. 7) between the rearward end of the sliding support 40 and the rearward wall 28 of the stationary support section is approximately equal to the fore-to-aft width of the step member 42. This permits the step member to be pivoted forwardly and downwardly (as will also be described in greater detail below), from the vertical orientation shown in FIG. 3 to the horizontal orientation in FIG. 4. In this position the step member 42 therefore presents a step at a convenient height (several inches below the top of the step bumper 54) on which a person can stand in order to gain access to the pickup truck box when the tailgate is in the closed position.

Figure 9:
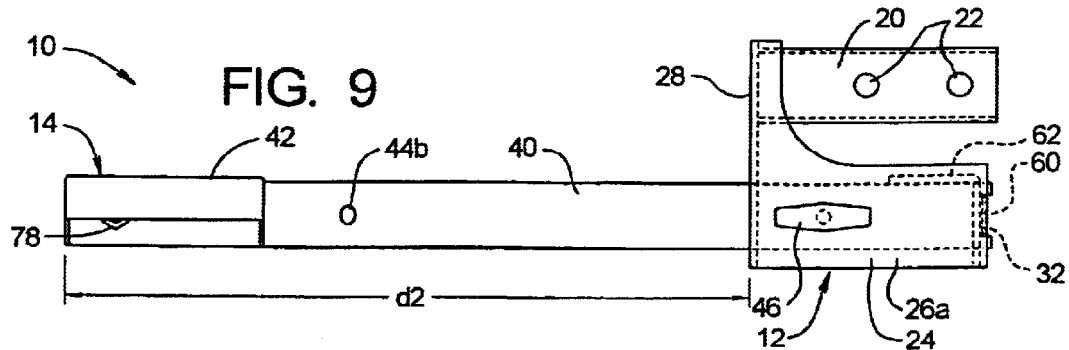

To further extend the step section 14, the operator again pulls outwardly on the locking mechanism 46 to disengage the locking pin from the lower support 40, and draws the support rearwardly to its fully extended position, in which the locking pin engages a third opening 44c (see FIGS. 7 and 8) and the step member 42 projects rearwardly above the fixed support section by second, increased distance "$d_2$" (see FIG. 9). As discussed above and as can be seen in FIG. 5, this distance is sufficient that the step member is positioned rearwardly of the lip of the tailgate 58 when the latter is in the open, lowered position. This permits the operator to enter the box of the pickup truck with no more difficulty than walking up a couple of stairs: first one foot is placed on the step member 42 and then the next foot is placed on the tailgate. The person is thus less able to enter and exit the box with ease, carrying parcels or other articles as desired.

A pair of flanges or ears 60 project laterally from the forward end of the sliding support member 40, and strike the forward face of the forward guide 32 of the stationary support section so as to form a stop that prevents the step section 14 from inadvertently being pulled out of the assembly. A reaction plate 62 is also welded or otherwise mounted to the upper edge of the forward guide 32, between the two side walls 26a, 26b of the bracket member, in order to strengthen the forward guide and bear upward loads created by the weight of a person standing on the step member and tending to cause the support to pivot about the rearward guide 30. As can be seen in FIGS. 6–9, the holes 44a–c in the support member are preferably somewhat vertically elongate in order to ensure that the upward loads are borne by plate 62 and not by the pin of the locking mechanism 46, so as to avoid damage/wear to the pin/holes and also to ensure that the pin can be easily withdrawn to unlock the sliding support when the assembly is in the fully extended position.

Retraction and stowage of the step assembly 10 is essentially the reverse of the above sequence: The step member 42 is pivoted to the vertical orientation (as will be described in greater detail below), and the handle of the locking mechanism is pulled out to disengage the locking pin from the sliding support member. The step section 14 is then pushed forwardly to the stowed position shown in FIGS. 2 and 6, and the locking pin "snaps" into bore 44a to lock the assembly in place until it is next needed.

c. Step Pivot Mechanism

FIGS. 10–14 illustrate the operation of the pivot mechanism 70, which enables the pivot member 42 of the step assembly to pivot between the horizontal and vertical orientations shown in FIGS. 2–9.

Figure 10:
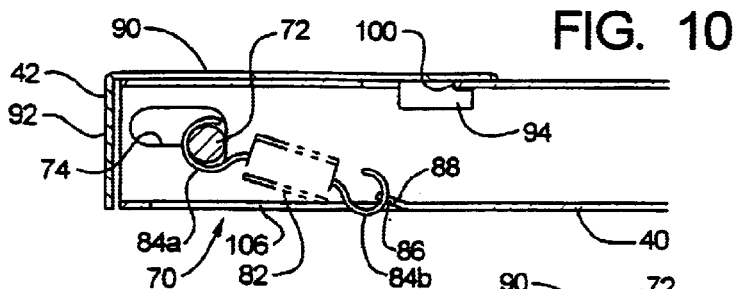
FIGS. 10–14 are sequential, partial sectional views of the step assembly of FIG. 1, showing the pivot mechanism by which the step member thereof is mounted to the lower support and the manner in which the tension spring of the mechanism extends to permit the step member to be pivoted between horizontal and vertical positions.

As can be seen in FIG. 10, the pivot mechanism includes a horizontal pivot shaft 72 that rides in corresponding L-shaped slots 74 (one slot only shown in the figures) that are formed in the rearward end of the lower support member 40. The pivot shafts extend along a transverse axis 74 (see FIG. 19) and through cooperating bores (not shown) formed in side walls 76a, 76b of the step member that lie adjacent and generally parallel to the elongate support member 40. The ends of the shaft that protrude outwardly beyond the sidewalls 76a, 76b are secured by threaded nuts 78 (see FIG. 8) or other suitable fasteners. The pivot pin 72 therefore provides an axis of rotation for pivoting the step member 42 relative to the rearward end of the sliding support member 40.

The L-shaped slot 74 includes an elongate, generally horizontal segment 80a, and a shorter, generally vertical segment 80b (see FIG. 11) that extends downwardly from the forward end of the horizontal segment, both segments being sized and configured to receive the pivot shaft 72 for rotation therein. A tension spring 82 interconnects the pivot shaft 72 and support member 40 so as to resiliently urge the pivot shaft forwardly and downwardly in slot 74, towards the lower end of segment 80b. In the illustrated embodiment, the tension spring is a short, suitably sized coil spring having a first hook portion 84a that fits over the pivot shaft 72, and a second hook portion 84b that passes through an opening 86 formed in an upwardly-angled tab 88 on the lower wall of the support member 40.

The step member 42, in turn, includes a generally planar tread portion 90, which serves as the upper surface of the step and may by provided with suitable texturing. The portion 90 has a depth (forward to aft dimension) that is suitable to provide a firm footing (e.g., 6"), and a depending flange portion 92 extends downwardly from the rearward edge of the tread portion generally perpendicular thereto. The depending flange portion 92 preferably has a height that is approximately equal to or greater than the height of the tubular lower support 40 (e.g., 2 inches), so that the flange portion covers and bears against substantially the entire end of the support when in the deployed position.

As can be seen with further reference to FIG. 10, a latch hook 94 extends downwardly from the underside of the tread portion 90 so as to protrude downwardly through an opening 96 in the upper wall of tubular support 40 when the step is in the deployed position. The hook includes a forwardly-facing view or slot 98 that is configured to receive the forward lip 100 of the opening in relatively close-fitting engagement therewith.

When in the deployed position, as shown in FIG. 10, the tension spring 82 biases the step member 42 to a forward position in which the slot 98 of the latch hook receives and engages the lip 100 of the support member 40. This holds the tread portion 90 in a horizontal orientation and in load bearing engagement with the upper surface of the square tubing of the lower support member, providing a firm and stable step platform. Furthermore, the tension exerted by the spring member biases the pivot shaft 72 downwardly into the vertically-extending leg 80b of slot 74; in this position the vertical walls of the slot obviate any possibility of the pivot pin sliding rearwardly and allowing the hook portion to inadvertently disengage from lip 100. The assembly thus provides an extremely stable and safe step platform when in the deployed position.

Figure 11:
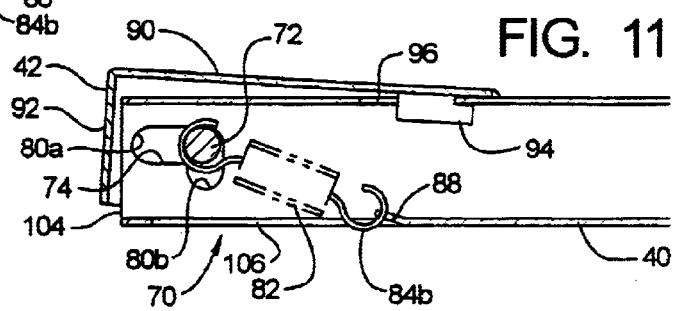
Figure 12:
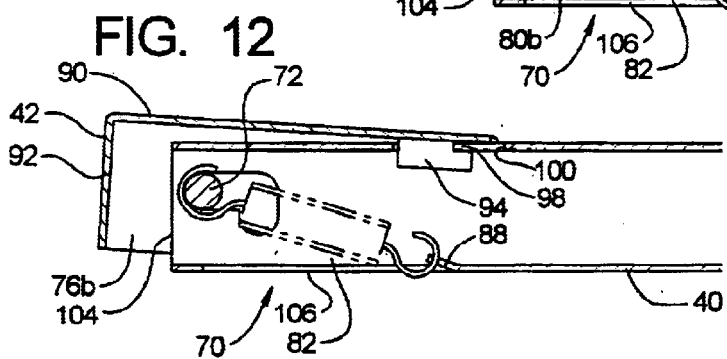

In order to move the step assembly to its stowed configuration, the operator first grasps the step member 42 and lifts its rearward edge upwardly, as shown in FIG. 11; the slot 98 in hook portion 94 is preferably sized slightly wider than the thickness of the material of lip 100 in order to allow a small degree of pivoting motion that facilitates this lifting action. As the step member is lifted, the pivot shaft 72 leaves the vertical segment 80b of slot 74 and enters the horizontal segment 80a. The pivot shaft can then be drawn rearwardly by pulling back on the step member 42, as shown in FIG. 12. As this happens, the slot 98 of the hook portion moves rearwardly out of engagement with the lip 100 of the support member, thus freeing the step member for pivoting movement.

Figure 13:
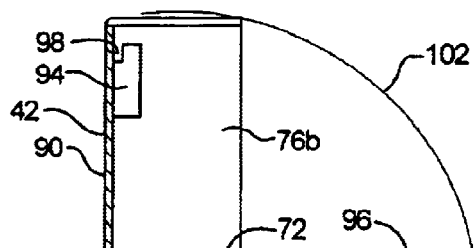
Figure 14:
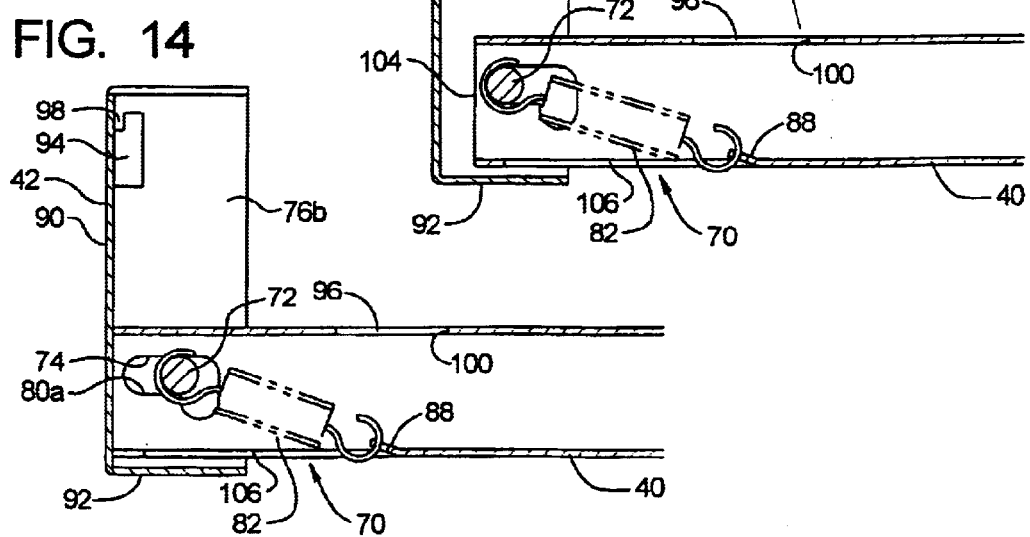

The operator then pivots the step member 42 to a vertical orientation, as indicated by arc 102 in FIG. 13. As this is done, the semicircular rearward end of the horizontal slot segment 80a prevents the step member from being pulled out of the support member and also provides a bearing surface to provide smooth action and reduced wear. Once the step member 42 has been rotated to the vertical orientation, the operator releases the step member and the tension exerted by spring member 82 pulls the pivot shaft 72 back forwardly in the horizontal slot segment 80a. This moves the lower (now forward) surface of the tread portion 90 into firm engagement with the square-cut end 104 of the tubular support member (see FIG. 13), thereby stabilizing the step assembly against rocking back and forth and rattling when in the stowed position. To return the step member to the horizontal, deployed configuration, the operator pulls the step member rearwardly from a position shown in FIG. 14 and repeats the above steps in reverse order.

The pivoting step mechanism of the present invention is therefore stable, durable and long lasting, and presents a neat and tidy appearance when in the stowed position. The mechanism is easily serviced by periodically lubricating the pivot shaft and associated components, access to which is provided by an opening 106 in the bottom of the tubular support member 40; the opening also provides access to the spring member 82 for repair or replacement, if necessary.

It will be understood that other forms of latch and pivot mechanisms may be employed in some embodiments may be employed in some embodiments of the present invention. Furthermore, it will be understood that the step member may not be pivotable in all embodiments of the invention and may in some instances be fixed in a horizontal orientation, and likewise a step latch mechanism may not be present in all embodiments.

d. Stationary Support Section

FIGS. 15–17 show the stationary support section of the assembly in greater detail.

In particular, as can be seen, the stationary support section 12 includes the horizontal upper support member 20, which is suitably constructed of a short piece of square-section steel tubing sized to fit within a conventional 2"×2" or 1¼"×1¼" receiver. The stationary support structure may have any suitable configuration that supports the lower support member at the designed distance below the receiver. In the illustrated embodiments, the rearward end of the upper support is welded or otherwise mounted to the rearward wall 28 of the support bracket 24, and the two side walls 26a, 26b extend forwardly and downwardly therefrom generally parallel to the support member. As can be seen in FIG. 15, the upper edge 110 of each of the side walls extends downwardly to form a cutaway that provides clearance for chain loops and other structures adjacent the receiver tube, and is also convexly curved to minimize the concentration of stresses that might otherwise cause fracturing over extended use.

As noted above, the first guide opening for the lower support member 30 is formed as square cutout in the rear wall 28 of the support bracket. The forward guide opening 32, in turn, is defined by a U-shaped cutaway in the forward wall member 112 that is welded between the forward, lower ends of the two side walls 26a, 26b, with the upper wall of the square guide opening being provided by the reaction plate 62. Both guide openings 30, 32 are axially aligned so that the lower support member will slide therethrough as it is extended and retracted in the manner described above.

It will be understood that a single guide, such as a length of tubing, or other guide structure may be used in place of the forward and rearward guide openings that are shown. Moreover, it will be understood that in some embodiments the lower support may be formed as two or more sliding supports, with associated guide structures rather than as a single support as shown in the illustrated embodiment.

e. Step Member

FIGS. 18–19 show the structure of the step member 42 in greater detail. As noted above, the step member includes an upper tread portion 90 for engaging the user's foot and a downwardly-extending rearward flange portion 92, as well as first and second guide walls 76a, 76b that extend adjacent and parallel to the horizontal support member. The guide walls include coaxially aligned bores (not shown) which cooperate with the pivot shaft 72 to provide the axis of rotation for pivoting movement of the step member, as described above.

First and second outer sidewalls 114a, 114b extend from the rear wall 92 forwardly along the lateral edges of the tread portion 90, and are joined at their lower ends to the guide walls 76a, 76b by laterally extending forward wall segments 116a, 116b. The various members are joined along their ends and edges by welding or other suitable means, thereby providing a highly rigid and sturdy step structure.

Furthermore, as can be seen in FIG. 18, the lower edges of the rearward flange portion 92 and the wall segments 116a, 116b slope upwardly towards the sides of the step member, so that at their inward ends the flange and wall segments extend the full 2-inch (or 1¼-inch) height of the lower support member, while at their outer ends the side walls 114a, 114b have a reduced height (e.g., ¾-inch) such that these are comfortably gripped by a user's fingers when sliding the assembly in and out and pivoting the step member.

It will be understood that the configuration of the step member is somewhat a matter of design choice and may vary from the illustrated embodiment. For example, the step member may have a shape different from that shown (e.g., square or rounded), the tread portion may be formed as a grate rather than being generally planar, and so on.

f. Locking Mechanism

Figure 20:
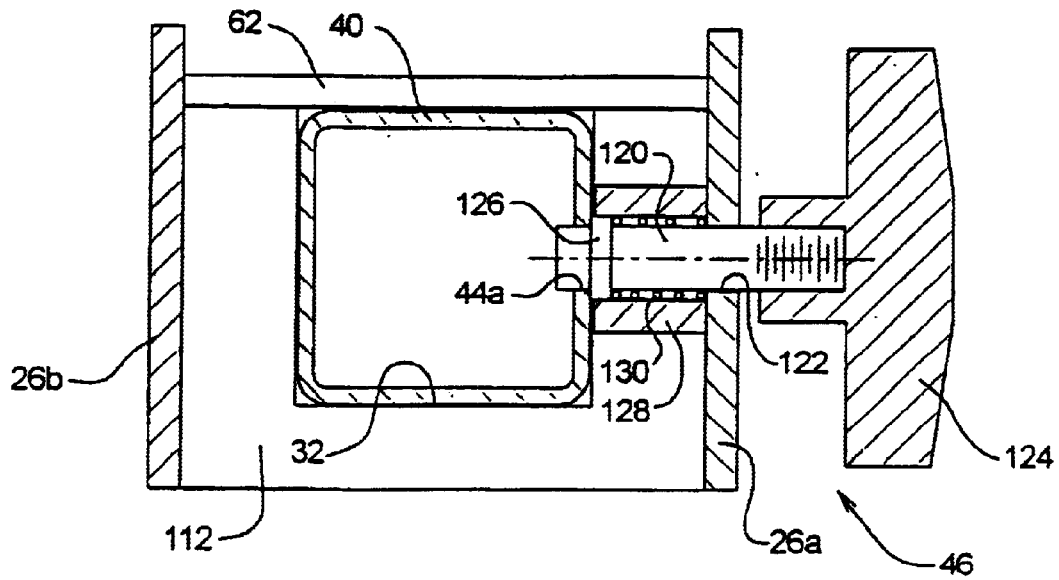
FIGS. 20–21 are sequential, cross-sectional views of the locking mechanism of the hitch assembly of FIG. 1, showing the spring-loaded locking pin in a first position in which the locking pin prevents the lower support member from moving within the stationary support structure, and a second position in which the locking pin is withdrawn from engagement with the lower support member so as to permit the lower support member to slide within the stationary support section to an extended length.
Figure 21:
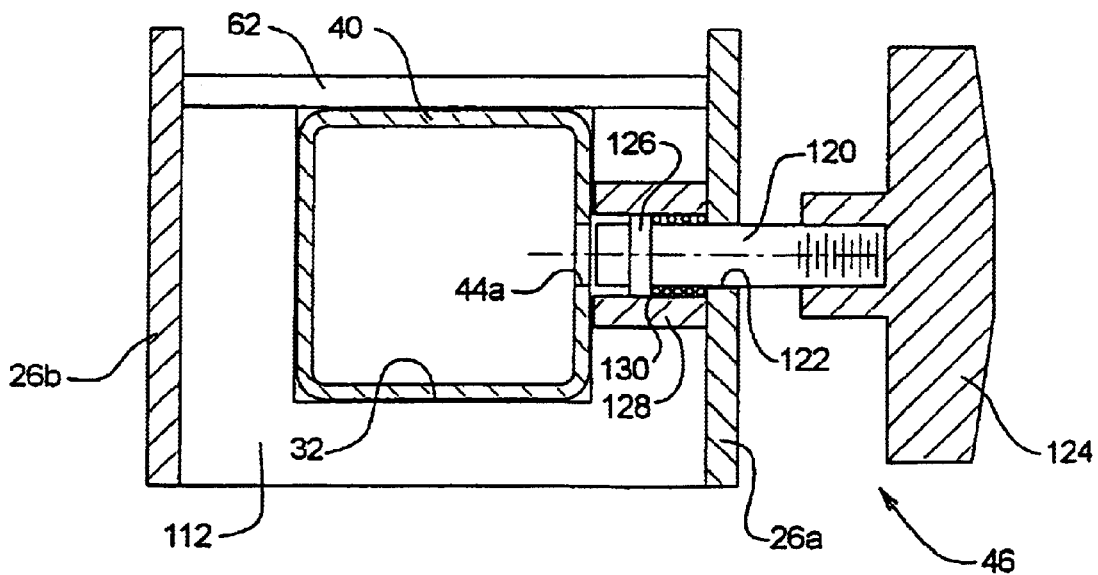

FIGS. 20–21 show the structure of the locking mechanism 46 in greater detail. As can be seen, the mechanism includes a locking pin 120 having a protruding end that engages the cooperating bores 44a–44c in the tubular lower support member 40. The shaft extends horizontally through a coaxially-aligned bore 122 in the bracket side wall 26a, and has a T-shaped handle 124 threadingly or otherwise mounted to its outer end. Reaction ring 126 (e.g., a suitably sized washer) is threadingly or otherwise mounted around the inwardly projecting shaft of the pin 120, proximate its outwardly projecting end but spaced therefrom by a distance sufficient that the protruding tip passes fully into and engages the openings 44a–c.

The shaft of the locking pin 120 is housed in coaxial relationship within a sleeve 128 that is mounted to and extends inwardly from the side wall 26a of the support bracket and terminates adjacent the side wall of the support member 40. The reaction ring 126 is sized for reciprocating sliding movement within sleeve 128, and a compression spring 130 is mounted around the shaft of the locking pin between the reaction ring and the fixed side wall 26a. The compression spring is in a partially compressed condition within the initial position shown in FIG. 20, so that the protruding end of the locking pin is biased into engagement with the opening 44a. The compression spring therefore holds the pin against accidental disengagement from the sliding support member, with the reaction ring 126 bearing against the outer surface of the support member to form a stop that prevents overextension of the pin.

In order to release the lower support member 40 for sliding extension/retraction, the operator grasps handle 124 and pulls this outwardly (e.g., to the right) as shown in FIG. 21. In this position, the protruding end of pin 120 is withdrawn from engagement from bore 44a, freeing the support member to slide forwardly or rearwardly relative to the locking mechanism and the stationary support section to which it is mounted. The operator then releases the handle 124, and upon the next of the openings 44a–c moving into alignment therewith the compression spring 130 biases the pin back through the opening, so that the pin "snaps" home into engagement with the support member and locks the assembly in place without further assistance from the operator.

It will be understood that other suitable forms of locking mechanisms may be used in other embodiments of the invention, such as various forms of detents, latches, notches and so on, and furthermore that some embodiments may not include any locking mechanism for the lower support.

It is therefore to be recognized that various alterations, modifications, and/or additions may be introduced into the constructions and arrangements of parts described above without departing from the spirit or ambit of the present invention.

What is claimed is:

1. A step assembly for a vehicle having a hitch receiver and a tailgate, said hitch assembly comprising:
   a stationary upper support member that is insertable in said hitch receiver so as to support said assembly therefrom;
   a frame member mounted to and extending downwardly from said upper support member;
   a sliding lower support member mounted in said frame member generally below and parallel to said upper support member for movement from a forward, retracted position to a rearward, extended position; and
   a step member mounted to a rearward end of said sliding lower support member so that when said lower support member is in said retracted position said step member is positioned proximate said hitch receiver and when said lower support member is in said extended position said step member is positioned rearwardly of said hitch receiver by a distance sufficient that said step member may be stood upon when said tailgate of said vehicle is in an open, lowered position.

2. The step assembly of claim 1, further comprising:
   means for pivoting said step member from a generally horizontal orientation in which said step member may be stood upon when said lower support is in said extended position, to a generally vertical orientation in which said step member stows substantially flat with respect to a rear of said vehicle when said sliding lower support is in said retracted position.

3. The step assembly of claim 2, wherein said means for pivoting said step member from said generally horizontal orientation to said generally vertical orientation comprises a pivot shaft operatively interconnecting said step member and said rearward end of said lower support member.

4. The step assembly of claim 1, wherein said stationary upper support member comprises:
   a segment of substantially square-section stock dimensioned for insertion into a standard hitch receiver of predetermined size.

5. The step assembly of claim 4, wherein said frame member comprises a downwardly extending portion having at least one guide opening that receives said lower support member in sliding engagement therewith.

6. The step assembly of claim 5, further comprising:
   means for selectively locking said lower support member in said retracted position so as to prevent said lower support member from sliding rearwardly while said vehicle is in operation.

7. The step assembly of claim 6, wherein said means for locking said lower support member in said retracted position comprises:
   an opening formed in said lower support member proximate said rearward end thereof; and
   a locking pin mounted to said downwardly extending portion of said support member so as to retractably engage said opening when said lower support member is in said retracted position.

8. The step assembly of claim 7, wherein said means for locking said lower support member in said retracted position further comprises:
   a handle mounted to an outer end of said locking pin for manually withdrawing said pin from engagement with said opening in said lower support member; and
   a spring operatively connected to said locking pin so as to yieldingly bias said pin into engagement with said opening when said handle is released.

9. The step assembly of claim 8, further comprising:
   a second opening formed in said lower support proximate a forward end thereof for being engaged by said locking pin so as to selectively lock said lower support in said extended position.

10. The step assembly of claim 9, further comprising:
    a third opening formed in said lower support member intermediate said first and second openings for being engaged by said locking pin so as to selectively lock said lower support in an intermediate position in which said step member is positioned proximate a bumper of said vehicle, so that said step member may be stood upon to gain access to a rear compartment of said vehicle when said tailgate is in a closed, raised position.

11. The step assembly of claim 5, wherein said guide opening in said downwardly extending portion of said frame member is spaced below said upper support member by a distance sufficient that said lower support member when in said retracted position will clear a spare tire that extends below a rear of said vehicle by a predetermined distance.

12. The step assembly of claim 5, wherein said downwardly extending portion of said frame member has forward and rearward axially aligned guide openings that maintain said lower supportment member in a substantially horizontal orientation as said lower support member is slid between said extended and retracted positions.

13. The step assembly of claim 12, wherein said frame member comprises:
   a U-shaped support bracket having a rearward wall that is mounted to a rearward end of said upper support member, and first and second side walls that extend downwardly and forwardly so as to clear obstructions on said vehicle proximate said hitch receiver;
   said rearward guide opening being formed in said rearward wall of said support bracket and said forward guide opening being formed between forwardly extending ends of said side walls thereof.

14. The step assembly of claim 13, wherein said frame member further comprises:
   a reaction plate mounted to said support bracket adjacent said forward guide opening so as to bear against and receive upward loads from an upper surface of said lower support member when said step member is stood upon.

15. The step assembly of claim 13, wherein said lower support member comprises an elongate segment of substantially square-section stock, and said forward and rearward guide openings each have a corresponding square configuration so that said guide openings bear against sides of said lower support member in sliding engagement therewith.

16. The step assembly of claim 3, further comprising:
   means for selectively locking said step member in said horizontal orientation so that said step member provides a stable platform when stood upon.

17. The step assembly of claim 16, wherein said means for selectively locking said step member in said horizontal orientation comprises:
   a pivot slot formed in said lower support member and having said pivot shaft received therein in rotating engagement therewith;
   a latch opening formed in an upper side of said lower support member and having a forward lip;
   a latch hook mounted to said step member so as to extend downwardly through said latch opening when said step member is in said horizontal orientation and having a forwardly facing jaw for engaging said forward lip of said latch opening; and
   a spring member operatively interconnecting said pivot shaft and said lower support member so as to bias said shaft towards a forward end of said pivot slot;
   so that when said step member is in said horizontal orientation said jaw opening of said latch hook is urged by said spring into engagement with said forward lip of said latch opening so as to lock said step member in said horizontal orientation, and so that in response to an operator selectively drawing rearwardly on said step member said pivot shaft moves rearwardly in said pivot slot so as to disengage said jaw of said hook from said lip of said latch opening and thereby free said step member to be pivoted to said vertical orientation.

18. The step assembly of claim 17, wherein said pivot slot comprises:
   an L-shaped slot having a rearward, generally horizontally extending segment and a forward, generally downwardly extending segment;
   said spring member being configured to bias said pivot shaft forwardly and downwardly in said L-shaped slot;
   so that when said step member is in said horizontal orientation said pivot shaft is urged into said downwardly extending segment of said pivot slot so that said downwardly extending segment holds said shaft and step member against moving rearwardly and thereby prevents said jaw opening of said latch hook from inadvertently moving out of engagement with said lip of said latch opening, and so that in response to an operator selectively lifting upwardly on said step member said pivot shaft moves upwardly out of said downwardly extending segment of said pivot slot and into said horizontally extending segment of said slot so that said step member may then be drawn rearwardly to disengage said jaw of said hook from said lip of said latch opening.

19. The step assembly of claim 18, wherein said spring member comprises a tension spring having a first end mounted to said pivot shaft and a second end mounted to said lower support member forwardly and downwardly from said pivot shaft.

\* \* \* \* \*